(12) United States Patent
Nakata

(10) Patent No.: US 9,530,431 B2
(45) Date of Patent: Dec. 27, 2016

(54) DEVICE METHOD, AND COMPUTER PROGRAM PRODUCT FOR CALCULATING SCORE REPRESENTING CORRECTNESS OF VOICE

(71) Applicant: KABUSHIKI KAISHA TOSHIBA, Minato-ku, Tokyo (JP)

(72) Inventor: Kouta Nakata, Shinagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 184 days.

(21) Appl. No.: 14/193,099

(22) Filed: Feb. 28, 2014

(65) Prior Publication Data

US 2014/0358548 A1 Dec. 4, 2014

(30) Foreign Application Priority Data

Jun. 3, 2013 (JP) .................................. 2013-117261

(51) Int. Cl.
| G10L 13/08 | (2013.01) |
| G10L 25/60 | (2013.01) |
| G09B 19/04 | (2006.01) |
| G10L 15/02 | (2006.01) |

(52) U.S. Cl.
CPC .............. *G10L 25/60* (2013.01); *G09B 19/04* (2013.01); *G10L 2015/025* (2013.01)

(58) Field of Classification Search
CPC ..... G10L 25/60; G10L 2015/025; G09B 19/04
USPC ................................................ 704/257–268
See application file for complete search history.

(56) References Cited

U.S. PATENT DOCUMENTS

| 5,909,666 | A | * | 6/1999 | Gould | ................... | G09B 19/04 |
| | | | | | | 704/231 |
| 2007/0033041 | A1 | * | 2/2007 | Norton | ................... | G10L 17/20 |
| | | | | | | 704/254 |
| 2007/0071206 | A1 | * | 3/2007 | Gainsboro | .......... | H04M 3/2281 |
| | | | | | | 379/168 |
| 2008/0270344 | A1 | * | 10/2008 | Yurick | .............. | G06F 17/30026 |

FOREIGN PATENT DOCUMENTS

JP  2003-186489  7/2003

\* cited by examiner

*Primary Examiner* — Marcellus Augustin
(74) *Attorney, Agent, or Firm* — Amin, Turocy & Watson LLP

(57) ABSTRACT

According to an embodiment, a voice processor includes a presenting unit to present text to an operator; a voice acquisition unit to acquire a voice of the operator reading aloud the text; an identifying unit to identify output intervals of phonemes included in the voice; a determination unit to determine whether each of time lengths of the output intervals is normal; a frequency acquisition unit to acquire frequency values respectively representing occurrence frequencies of contexts, respectively corresponding to the phonemes, the context including the phoneme and another phoneme adjacent to at least one side of the phoneme; and a score calculator to calculate a score representing correctness of the voice on the basis of the determination results of the time lengths of the output intervals and the frequency values of the contexts acquired respectively corresponding to the phonemes.

8 Claims, 14 Drawing Sheets

| POSITION | PHONEME | CONTEXT | FREQUENCY VALUE |
|---|---|---|---|
| 1 | ae | sil-ae | 1,000,000 |
| 2 | v | ae-v | 2,000,000 |
| 3 | @ | v-@ | 2,000,000 |
| 4 | k | @-k | 1,000,000 |
| 5 | aa | k-aa | 1,000,000 |
| 6 | d | aa-d | 2,000 |
| 7 | ou | d-ou | 2,000 |
| 8 | k | ou-k | 500,000 |
| 9 | ei | k-ei | 1,000,000 |
| 10 | k | ei-k | 1,000,000 |

FIG.4

| POSITION | PHONEME |
|---|---|
| 1 | m |
| 2 | o |
| 3 | Q |
| 4 | cw |
| 5 | a |
| 6 | r |
| 7 | e |
| 8 | r |
| 9 | a |

FIG.5

| POSITION | PHONEME | CONTEXT |
|---|---|---|
| 1 | m | sil-m |
| 2 | o | m-o |
| 3 | Q | o-Q |
| 4 | cw | Q-cw |
| 5 | a | cw-a |
| 6 | r | a-r |
| 7 | e | r-e |
| 8 | r | e-r |
| 9 | a | r-a |

| POSITION | PHONEME | START TIME (SECONDS) | END TIME (SECONDS) |
|---|---|---|---|
| 1 | m | 1.20 | 1.29 |
| 2 | o | 1.29 | 1.39 |
| 3 | Q | 1.39 | 1.43 |
| 4 | cw | 1.43 | 1.47 |
| 5 | a | 1.47 | 1.66 |
| 6 | r | 1.66 | 1.73 |
| 7 | e | 1.73 | 1.80 |
| 8 | r | 1.80 | 1.87 |
| 9 | a | 1.87 | 1.94 |

FIG.8

| POSITION | PHONEME | START TIME (SECONDS) | END TIME (SECONDS) | LABEL |
|---|---|---|---|---|
| 1 | m | 1.20 | 1.29 | NORMAL |
| 2 | o | 1.29 | 1.39 | NORMAL |
| 3 | Q | 1.39 | 1.43 | ABNORMAL |
| 4 | cw | 1.43 | 1.47 | ABNORMAL |
| 5 | a | 1.47 | 1.66 | ABNORMAL |
| 6 | r | 1.66 | 1.73 | NORMAL |
| 7 | e | 1.73 | 1.80 | NORMAL |
| 8 | r | 1.80 | 1.87 | NORMAL |
| 9 | a | 1.87 | 1.94 | NORMAL |

FIG.9

| POSITION | PHONEME | CONTEXT | FREQUENCY VALUE |
|---|---|---|---|
| 1 | m | sil-m | 1,000,000 |
| 2 | o | m-o | 500,000 |
| 3 | Q | o-Q | 100,000 |
| 4 | cw | Q-cw | 1,000 |
| 5 | a | cw-a | 2,000 |
| 6 | r | a-r | 1,000,000 |
| 7 | e | r-e | 2,000,000 |
| 8 | r | e-r | 1,000,000 |
| 9 | a | r-a | 1,000,000 |

FIG.10

| POSITION | PHONEME | WEIGHT |
|---|---|---|
| 1 | m | 1.0 |
| 2 | o | 1.0 |
| 3 | Q | 1.0 |
| 4 | cw | 0.1 |
| 5 | a | 0.1 |
| 6 | r | 1.0 |
| 7 | e | 1.0 |
| 8 | r | 1.0 |
| 9 | a | 1.0 |

FIG.11

PLEASE READ ALOUD TEXT(5 POINTS PER TEXT)

TEXT: "MOTTSUARERA"

● RECO-RDING    ➡ NEXT    SCORE=95 BONUS+5 POINTS 71    72    70

| POSITION | PHONEME | CONTEXT |
|---|---|---|
| 1 | ae | sil-ae |
| 2 | v | ae-v |
| 3 | @ | v-@ |
| 4 | k | @-k |
| 5 | aa | k-aa |
| 6 | d | aa-d |
| 7 | ou | d-ou |
| 8 | k | ou-k |
| 9 | ei | k-ei |
| 10 | k | ei-k |

FIG.17

| POSITION | PHONEME | START TIME (SECONDS) | END TIME (SECONDS) |
|---|---|---|---|
| 1 | ae | 1.20 | 1.29 |
| 2 | v | 1.29 | 1.39 |
| 3 | @ | 1.39 | 1.45 |
| 4 | k | 1.45 | 1.51 |
| 5 | aa | 1.51 | 1.62 |
| 6 | d | 1.62 | 1.65 |
| 7 | ou | 1.65 | 1.81 |
| 8 | k | 1.81 | 1.87 |
| 9 | ei | 1.87 | 1.94 |
| 10 | k | 1.94 | 2.00 |

FIG.18

| POSITION | PHONEME | START TIME (SECONDS) | END TIME (SECONDS) | LABEL |
|---|---|---|---|---|
| 1 | ae | 1.20 | 1.29 | NORMAL |
| 2 | v | 1.29 | 1.39 | NORMAL |
| 3 | @ | 1.39 | 1.45 | NORMAL |
| 4 | k | 1.45 | 1.51 | NORMAL |
| 5 | aa | 1.51 | 1.62 | NORMAL |
| 6 | d | 1.62 | 1.65 | ABNORMAL |
| 7 | ou | 1.65 | 1.81 | ABNORMAL |
| 8 | k | 1.81 | 1.87 | NORMAL |
| 9 | ei | 1.87 | 1.94 | NORMAL |
| 10 | k | 1.94 | 2.00 | NORMAL |

FIG.19

| POSITION | PHONEME | CONTEXT | FREQUENCY VALUE |
|---|---|---|---|
| 1 | ae | sil-ae | 1,000,000 |
| 2 | v | ae-v | 2,000,000 |
| 3 | @ | v-@ | 2,000,000 |
| 4 | k | @-k | 1,000,000 |
| 5 | aa | k-aa | 1,000,000 |
| 6 | d | aa-d | 2,000 |
| 7 | ou | d-ou | 2,000 |
| 8 | k | ou-k | 500,000 |
| 9 | ei | k-ei | 1,000,000 |
| 10 | k | ei-k | 1,000,000 |

FIG.20

| POSITION | PHONEME | WEIGHT |
|---|---|---|
| 1 | ae | 1.0 |
| 2 | v | 1.0 |
| 3 | @ | 1.0 |
| 4 | k | 1.0 |
| 5 | aa | 1.0 |
| 6 | d | 0.1 |
| 7 | ou | 0.1 |
| 8 | k | 1.0 |
| 9 | ei | 1.0 |
| 10 | k | 1.0 |

DEVICE METHOD, AND COMPUTER PROGRAM PRODUCT FOR CALCULATING SCORE REPRESENTING CORRECTNESS OF VOICE

CROSS-REFERENCE TO RELATED APPLICATION(S)

This application is based upon and claims the benefit of priority from Japanese Patent Application No. 2013-117261, filed on Jun. 3, 2013; the entire contents of which are incorporated herein by reference.

FIELD

An embodiment described herein relates generally to a voice processor, a voice processing method, and a computer program product.

BACKGROUND

Voice processing such as voice recognition or voice synthesis needs to collect a large amount of voices used for, for example, learning or evaluation. As one of the ways to collect voices, a system may be structured that collects voices from a large number of operators through the Internet and rewards the operators in return for their work. For example, JP-A 2003-186489 discloses a voice collection system that enables an utterer to perform recording by himself or herself by displaying character strings to be uttered and direction information to the utterer. Such a system can collect a large number of voices with a low cost in terms of time and economy.

In such a system, an operator performs recording work while reading aloud presented text at the operator's discretion. Thus, the operator may transmit a voice without reading aloud the text again when the operator fails to read aloud the text, and the poor quality voice that does not coincide with the text may be collected in the system. The use of the voices including a large number of such poor quality voices due to mistakes in reading aloud causes accuracy in voice processing to deteriorate.

BRIEF DESCRIPTION OF THE DRAWINGS

FIG. 4 is an exemplary diagram illustrating a phonemic string when Japanese text is selected;

FIG. 5 is an exemplary diagram illustrating contexts when the Japanese text is selected;

FIG. 8 is an exemplary diagram illustrating determination results of time lengths of the respective phonemes when the Japanese text is selected;

FIG. 9 is an exemplary diagram illustrating frequency values of the contexts when the Japanese text is selected;

FIG. 10 is an exemplary diagram illustrating weights of the respective phonemes when the Japanese text is selected;

FIG. 11 is an exemplary schematic diagram illustrating the text presenting screen on which a score is displayed;

FIG. 17 is an exemplary diagram illustrating the output intervals of the phonemes when the English text is selected;

FIG. 18 is an exemplary diagram illustrating the determination results of the time lengths of the respective phonemes when the English text is selected;

FIG. 19 is an exemplary diagram illustrating the frequency values of the contexts when the English text is selected;

FIG. 20 is an exemplary diagram illustrating the weights of the respective phonemes when the English text is selected.

DETAILED DESCRIPTION

According to a voice processor includes a presenting unit, a voice acquisition unit, an identifying unit, a determination unit, a frequency acquisition unit, and a score calculator. The presenting unit is configured to present text to an operator. The voice acquisition unit is configured to acquire a voice of the operator reading aloud the text. The identifying unit is configured to identify output intervals of phonemes included in the voice of the operator. The determination unit is configured to determine whether each of time lengths of the output intervals is normal. The frequency acquisition unit is configured to acquire frequency values respectively representing occurrence frequencies of contexts, respectively corresponding to the phonemes. The context includes the phoneme and another phoneme adjacent to at least one side of the phoneme. The score calculator is configured to calculate a score representing correctness of the voice of the operator on the basis of the determination results of the time lengths of the output intervals and the frequency values of the contexts acquired respectively corresponding to the phonemes.

An embodiment is described below with reference to the accompanying drawings.

Figure 1:
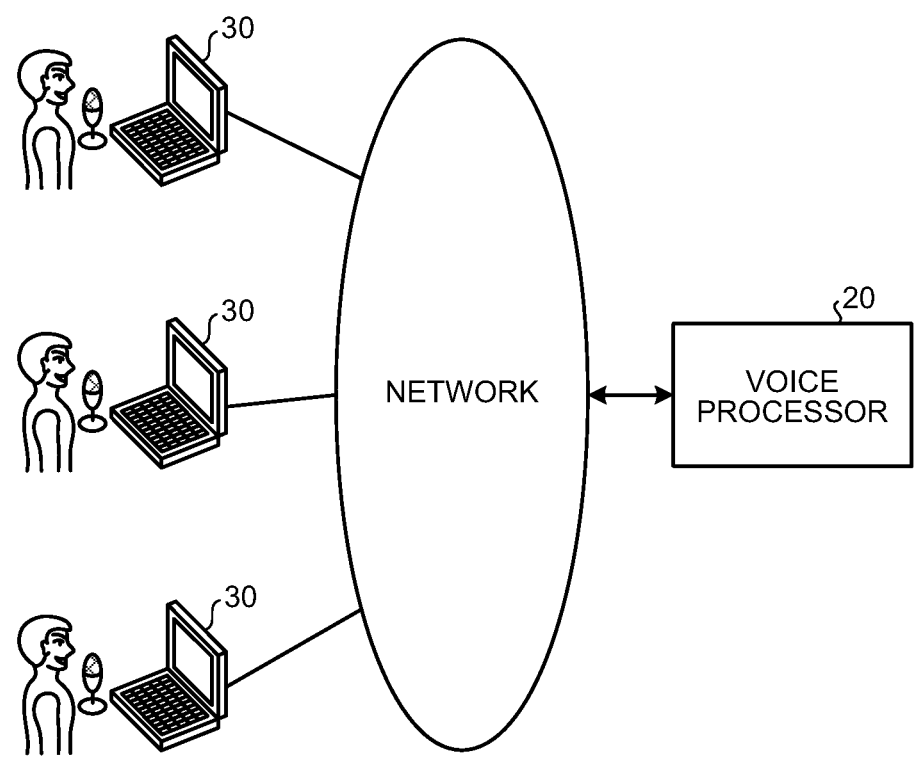
FIG. 1 is an exemplary structural diagram of a voice processing system.

FIG. 1 illustrates a structure of a voice processing system 10 according to an embodiment. The voice processing system 10 presents text to a plurality of operators and requests the operators to read aloud the text. The text is a character string such as a word or a sentence of any language. The voice processing system 10 converts voices read aloud by the operators to signals and acquires the signals. Hereinafter, the acquired signals converted from the voices are also referred to as the acquired voices. The voice processing system 10 enables the voices acquired in such a manner to be used for learning or evaluation in voice processing such as voice recognition or voice synthesis.

The voice processing system 10 includes a voice processor 20 and a plurality of terminal devices 30. The voice processor 20 is a computer connected to a network such as the Internet. Each of the terminal devices 30 is a computer, which is operated by the operator. The voice processor 20 and the respective terminal devices 30 are coupled with each other through the network.

The voice processor 20 presents text to the operators through their respective terminal devices 30 and instructs the respective operators to read aloud the presented text. The voice processor 20 acquires the voices read aloud by the respective operators as the signals and stores the acquired voices.

The voice processor 20 calculates a score representing correctness of the acquired voice. The voice processor 20 notifies each operator of the score through the terminal device 30, for example. The voice processor 20 stores the scores and the acquired voices in association with each other. The larger value of the score indicates that the operator reads aloud more correctly the text with fewer mistakes in reading aloud, for example. In other words, the smaller value of the score indicates that the voice of the operator is incorrect due to a lot of mistakes in reading aloud, for example.

The voice processing system 10 thus structured can make the operator aware of the correctness in reading aloud by notifying the operator of the score. The voice processing system 10 thus structured, which stores the acquired voices and the scores in association with each other, can also increase accuracy in voice processing by causing the voices having high scores to be used for learning or evaluation in the voice processing, for example.

Figure 2:
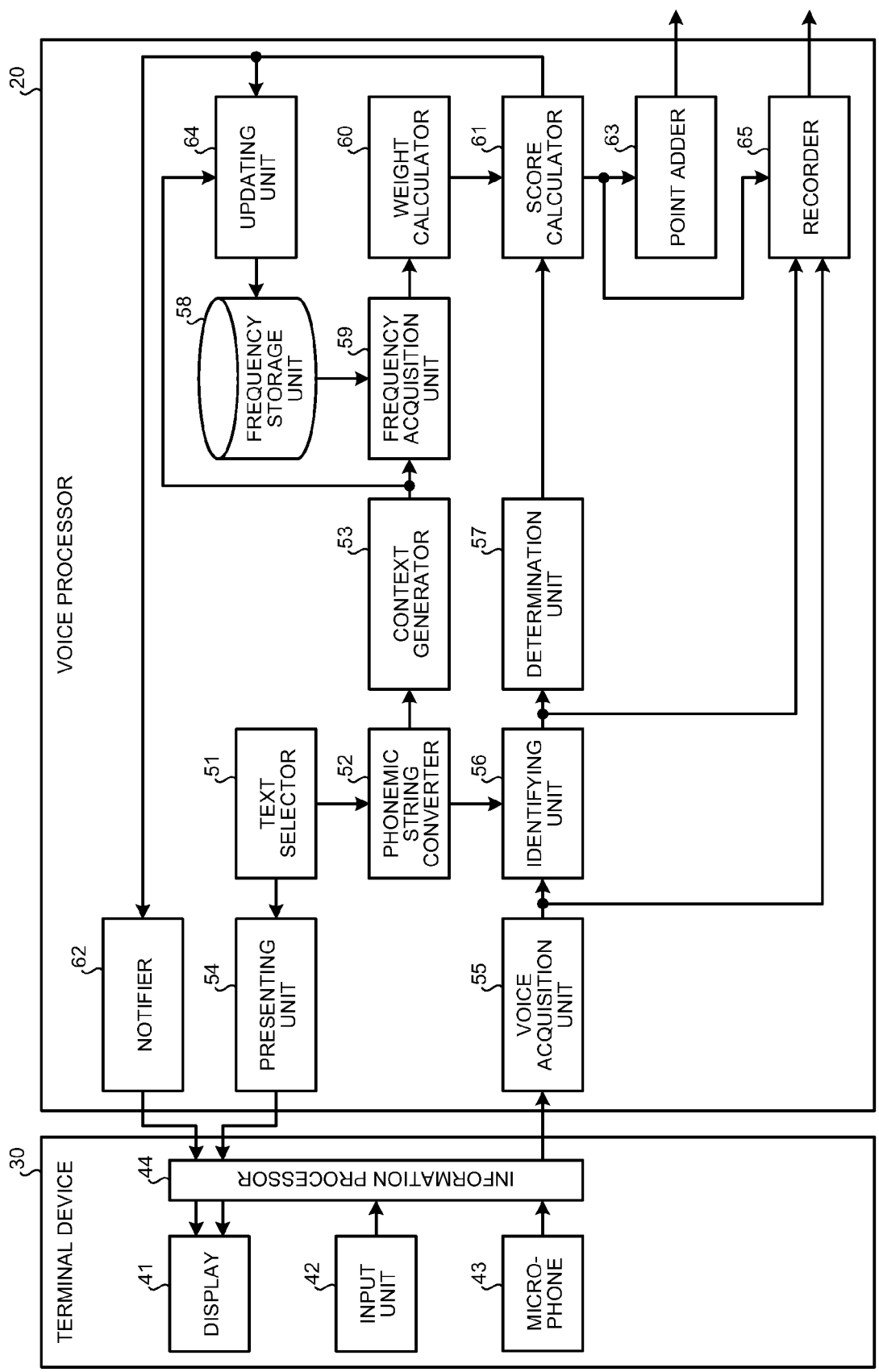
FIG. 2 is an exemplary structural diagram of a voice processor and a terminal device.

FIG. 2 illustrates structures of the voice processor 20 and the terminal device 30 according to the embodiment.

The terminal device 30 includes a display 41, an input unit 42, a microphone 43, and an information processor 44. The display 41 displays the text acquired from the voice processor 20. The display 41 displays the score acquired from the voice processor 20.

The input unit 42, which is a keyboard or a mouse, for example, receives operation of the operator. The microphone 43 converts the voice of the operator reading aloud the text to the signal.

The information processor 44 includes a central processing unit (CPU) and controls the terminal device 30 totally. The information processor 44 receives the text and the score from the voice processor 20 through the network and causes the display 41 to display the received text and score. The information processor 44 transmits the signal converted from the voice by the microphone 43 to the voice processor 20 through the network.

The voice processor 20 includes a text selector 51, a phonemic string converter 52, a context generator 53, a presenting unit 54, a voice acquisition unit 55, an identifying unit 56, a determination unit 57, a frequency storage unit 58, a frequency acquisition unit 59, a weight calculator 60, a score calculator 61, a notifier 62, a point adder 63, an updating unit 64, and a recorder 65.

The text selector 51 selects the text to be presented to the operator. The text selector 51 may read out the text selected in advance by an administrator, for example, or select the text to be presented to the operator from among a plurality of pieces of candidate text.

The phonemic string converter 52 converts the text selected by the text selector 51 into a phonemic string. A phoneme is a minimal unit of a sound to identify meanings of words uttered by persons. The phonemic string converter 52 converts the text into a symbolic sequence representing the respective phonemes on the basis of a correspondence table of the text and the phonemic string. The phonemic system varies depending on languages and interpretations of theories. The phonemic string converter 52 may convert the text into a phonemic string based on any interpretation as long as the phonemic system corresponds to the language of the selected text.

The context generator 53 generates contexts corresponding to the respective phonemes included in the phonemic string obtained by the conversion with the phonemic string converter 52. The context represents the combination of a certain phoneme and an adjacent phoneme adjacent to at least one side of the certain phoneme, i.e., the adjacent phoneme immediately before the certain phoneme and the adjacent phoneme immediately after the certain phoneme. The contexts called a biphone and a triphone are known. The biphone is the context representing the combination of a certain phoneme and the adjacent phoneme immediately before the certain phoneme. The triphone is the context representing the combination of a certain phoneme and the adjacent phonemes immediately before and after the certain phoneme. The context generator 53 may generate the biphones or the triphones.

The presenting unit 54 presents the text selected by the text selector 51 to the operator. The presenting unit 54 transmits the text to the terminal device 30 through the network and causes the display 41 of the terminal device 30 to display the text, for example.

The voice acquisition unit 55 acquires the voice of the operator reading aloud the presented text. The voice acquisition unit 55 receives the signal converted from the voice by the microphone 43 of the terminal device 30 through the network and stores the signal in a memory, for example.

The identifying unit 56 identifies output intervals of the respective phonemes included in the voice of the operator. Specifically, the identifying unit 56 detects the separations of the phonemes included in the voice of the operator and identifies start time and end time of each of the phonemes.

The identifying unit 56 analyzes the voice acquired by the voice acquisition unit 55 on the basis of the phonemic string obtained by the conversion with the phonemic string converter 52 using a forced alignment technique and identifies the output interval of each of the phonemes. The forced alignment technique identifies the output interval of the phoneme using the waveform or the like of the phoneme collected in the past, for example. In the forced alignment technique, it is highly likely that the output interval of the phoneme being collected more in the past can be identified more correctly than that of the phoneme being collected less in the past.

The determination unit 57 determines whether the time length of the output interval, which is identified by the identifying unit 56, of each of the phonemes is normal. The determination unit 57 then associates the determination results with the respective phonemes included in the voice. Specifically, the determination unit 57 associates labels each indicating that the time length is normal or abnormal (i.e., the time length is not normal) with the respective phonemes.

The time length of each of the phonemes included in the voice uttered by a person is typically in a certain range. Thus, when the time length, identified by the identifying unit 56, of the output interval of the phoneme is out of a certain range, the time length of the output interval of the identified phoneme is estimated as abnormal. The determination unit 57 thus determines for each phoneme whether the time length of the output interval of the phoneme is in a predetermined range, and if the time length of the output interval of the phoneme is in the predetermined range, determines the phoneme as normal and if the time length is out of the predetermined range, determines the phoneme as abnormal.

In other words, if the time length of the output interval of the phoneme is equal to or larger than the predetermined lower limit time length and equal to or smaller than the predetermined upper limit time length, the determination unit 57 determines that the phoneme is normal whereas if the time length is smaller than the lower limit time length or larger than the upper limit time length, the determination unit 57 determines that the phoneme is abnormal.

The range in which the time length of each of the phonemes is determined as normal may be the same regardless of the types of phonemes or may vary according to the type of phoneme. The range in which the time length of each of the phonemes is determined as normal may vary depending on languages.

The frequency storage unit 58 stores therein, for each context, a value representing occurrence frequency of the context included in the voices acquired in the past as frequency value. The frequency value is large when the number of times the context is included in the voices acquired in the past is large whereas the frequency value is small when the number of times the context is included in the voices acquired in the past is small.

The voices acquired in the past may be the voices acquired by the voice processing system 10 or may be the voices acquired by another system. The voices acquired in the past may include both of the voices acquired by the voice processing system 10 and the voices acquired by another system.

The frequency value does not have to be a value directly representing the occurrence frequency as long as it represents the occurrence frequency. Examples of the frequency value include a representative value of a level obtained by classifying the occurrence frequency into about 10 levels and a normalized value of the occurrence frequency.

The frequency acquisition unit 59 acquires, from the frequency storage unit 58, the frequency values of the contexts corresponding to the respective phonemes obtained by the conversion of the phonemic string converter 52. Specifically, the frequency acquisition unit 59 reads out, from the frequency storage unit 58, the frequency values corresponding to the respective contexts generated by the context generator 53.

The weight calculator 60 calculates a weight corresponding to each of the phonemes obtained by the conversion of the phonemic string converter 52 in accordance with the frequency value of the context acquired by the frequency acquisition unit 59. The weight is a coefficient represented by a numeral value, for example. The larger the frequency value the larger weight value the weight calculator 60 calculates whereas the smaller the frequency value the smaller weight value the weight calculator 60 calculates, for example.

The score calculator 61 calculates the score representing the correctness of the voice of the operator reading aloud the text on the basis of the results of the determination by the determination unit 57 on the time lengths of the output intervals of the phonemes and the weights calculated by the weight calculator 60 respectively corresponding to the phonemes.

Specifically, the score calculator 61 weights the determination results of the phonemes with corresponding respective weights. The score calculator 61 then calculates, as the score, a ratio of the number of determination results of the phonemes determined as normal to the total number of determination results after the weighting. The score calculator 61 can reflect in the score the determination results of the phonemes having large weights (i.e., phonemes having large occurrence frequencies) further than the determination results of the phonemes having small weights (i.e., phonemes having small occurrence frequencies).

The notifier 62 notifies the operator of content according to the score calculated by the score calculator 61. The notifier 62 transmits the score to the terminal device 30 through the network and causes the display 41 of the terminal device 30 to display the score, for example. The notifier 62 may convert the score into an evaluation value classified in two levels or three levels (e.g., evaluation level A, evaluation level B, and evaluation level C) and cause the display 41 to display the evaluation value, for example. As a result, the notifier 62 can make the operator aware of the correctness of the voice of the operator reading aloud the text.

The point adder 63 accesses an external point management server, for example, and adds a point to the operator in return for the reading aloud work. The point may be cash or electronic money, for example. Alternatively, the point adder 63 may transfer the corresponding amount of money to the operator's bank account, for example.

The point adder 63 may change the point in accordance with the score. The point adder 63 may add a bonus point to the operator who has read aloud the text in addition to a regular point when the calculated score of the voice of the operator is equal to or larger than a preset threshold, for example. As a result, the point adder 63 can motivate the operator to read aloud text more correctly.

The updating unit 64 updates the frequency values, stored in the frequency storage unit 58, of the contexts corresponding to the respective phonemes included in the voice of the operator reading aloud the text. In this case, the updating unit 64 may update the frequency values of the contexts on the condition that the score is equal to or larger than a certain threshold. As a result, the updating unit 64 can prevent the frequency values from being reflected in the frequency storage unit 58 when the text is incorrectly read aloud.

The recorder 65 stores the voice acquired by the voice acquisition unit 55 and the output intervals of the respective phonemes identified by the identifying unit 56 in an internal or an external storage device. As a result, the recorder 65 can cause the acquired voice to be used for voice processing.

In this case, the recorder 65 may further store the score in association with the voice. As a result, the recorder 65 can cause the voice having a high score (i.e., correct voice) to be used for voice processing. The recorder 65 can cause the reasons of mistakes in reading aloud to be analyzed by analyzing the voice having a low score.

Figure 3:
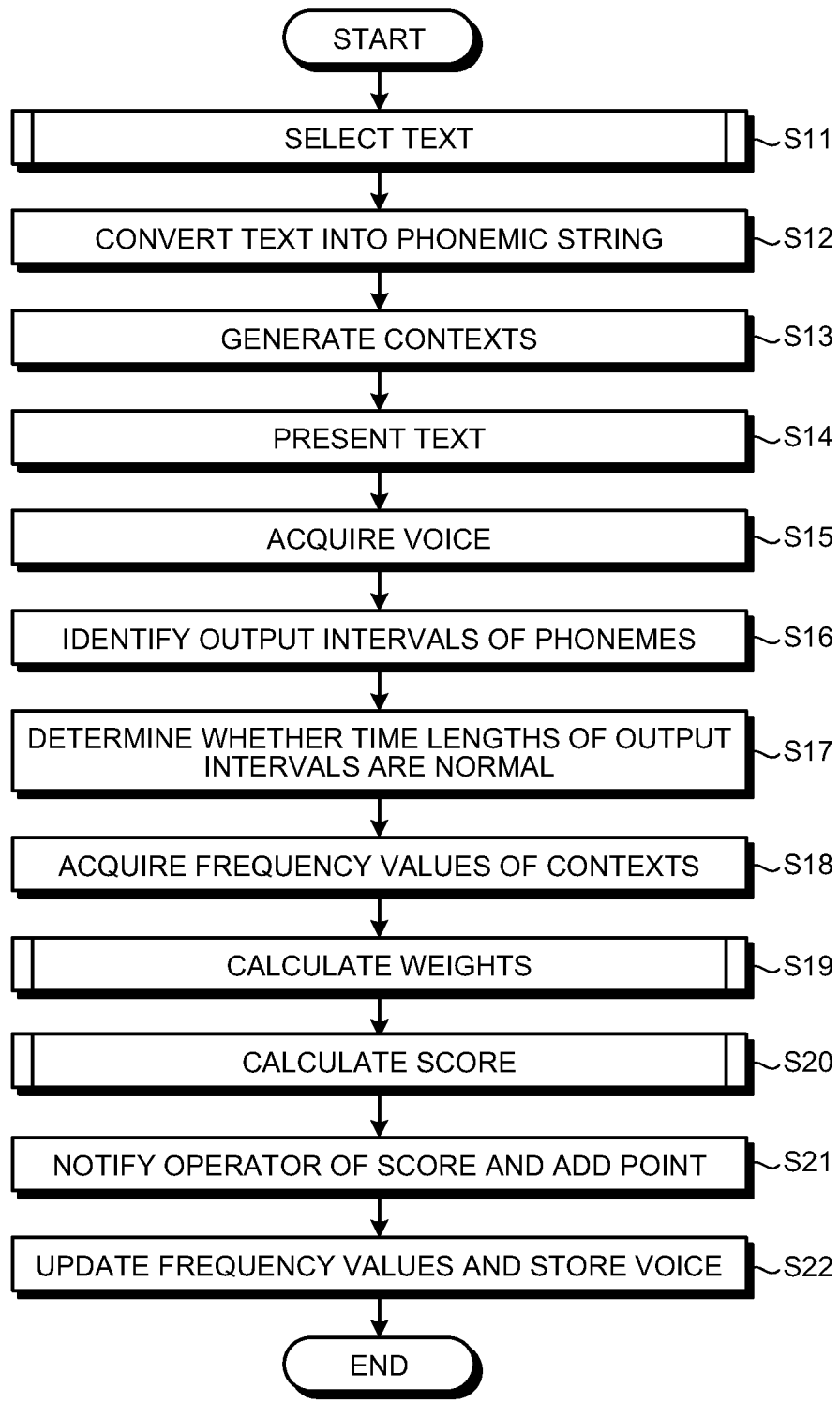
FIG. 3 is an exemplary flowchart of processing performed by the voice processor.

FIG. 3 illustrates a processing flow performed by the voice processor 20 according to the embodiment. The following describes the processing performed by the voice processor 20 with reference to FIG. 3.

At Step S11, the text selector 51 selects the text to be presented to the operator. As an example, the text selector 51 selects text of "mottsuarera (mozzarella in English)", a word in Japanese.

At Step S12, the phonemic string converter 52 converts the selected text into a phonemic string. In the example, the phonemic string converter 52 converts the text of "mottsuarera" into the phonemic string of "m-o-Q-cw-a-r-e-r-a", which is composed of nine phonemes as illustrated in FIG. 4.

At Step S13, the context generator 53 generates the contexts corresponding to the respective phonemes included in the phonemic string as the result of the conversion. In the example, the context generator 53 generates the contexts called the biphones.

Specifically, as illustrated in FIG. 5, the context generator 53 generates the context of "sil-m" corresponding to the phoneme of "m". The symbol of "sil" represents silence.

The context generator 53 generates the context of "m-o" corresponding to the phoneme of "o". The context generator 53 generates the context "o-Q" corresponding to the phoneme "Q". The context generator 53 generates the context of "Q-cw" corresponding to the phoneme of "cw". The context generator 53 generates the context of "cw-a" corresponding to the phoneme of "a". The context generator 53 generates the context of "a-r" corresponding to the phoneme of "r". The context generator 53 generates the context of "r-e" corresponding to the phoneme of "e". The context generator 53 generates the context of "e-r" corresponding to the phoneme of "r". The context generator 53 generates the context of "r-a" corresponding to the phoneme of "a".

Figures 6, 7:
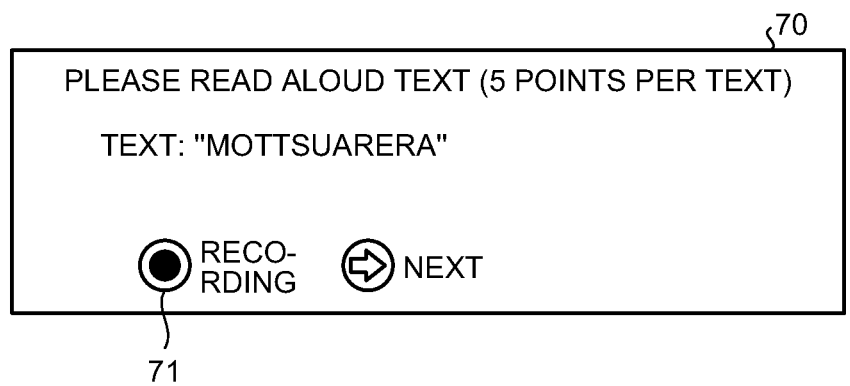
FIG. 6 is an exemplary schematic diagram illustrating a text presenting screen.
FIG. 7 is an exemplary diagram illustrating output intervals of phonemes when the Japanese text is selected.

At Step S14, the presenting unit 54 causes the display 41 of the terminal device 30 to display the selected text. In the example, the presenting unit 54 causes the display 41 to display a presenting screen 70 including the text of "mottsu-arera" as illustrated in FIG. 6.

A point indicating the reward for the reading aloud of the text (e.g., "5 points") may be displayed on the presenting screen 70 together with the text. On the presenting screen 70, a recording button 71 that starts recording of a voice is displayed, for example. The terminal device 30 starts recording of a voice of the operator through the microphone 43 once the recording button 71 is pressed by the operator.

At Step S15, the voice acquisition unit 55 acquires the voice recorded by the terminal device 30 through the network. The voice acquisition unit 55 then stores the acquired voice in a memory, for example.

At Step S16, the identifying unit 56 identifies the output intervals of the respective phonemes included in the acquired voice. In the example, the identifying unit 56 identifies the output intervals of the respective phonemes using the forced alignment technique. The identifying unit 56 identifies the output interval corresponding to each of the respective phonemes converted from the presented text, using the waveforms or the like of the respective phonemes collected in the past.

In the example, the identifying unit 56 identifies the start times and end times of the respective phonemes of "m", "o", "Q", "cw", "a", "r", "e", "r", and "a" as illustrated in FIG. 7. For example, the identifying unit 56 identifies on the first phoneme of "m" that the start time is 1.20 seconds and the end time is 1.29 seconds. For another example, the identifying unit 56 identifies on the fourth phoneme of "cw" that the start time is 1.43 seconds and the end time is 1.47 seconds.

The reference of the start time and the end time may be set to any time. In the example, the reference of the start time and the end time is the time of starting the recording.

At Step S17, the determination unit 57 determines whether the time length of the identified output interval of each of the respective phonemes is normal. As illustrated in FIG. 8, the determination unit 57 determines that the phoneme is normal when its time length from the star time to the end time is equal to or larger than 0.05 seconds and equal to or smaller than 0.15 seconds, in the example. In other words, the determination unit 57 determines that the phoneme is abnormal when its time length from the start time to the end time is smaller than 0.05 seconds or larger than 0.15 seconds. For example, the determination unit 57 determines that the first phoneme of "m" is normal because the time length is 0.09 seconds. For another example, the determination unit 57 determines that the fourth phoneme of "cw" is abnormal because the time length is 0.04 seconds.

As illustrated in FIG. 8, the determination unit 57 associates the labels each indicating normal or abnormal with the respective phonemes.

At Step S18, the frequency acquisition unit 59 acquires, from the frequency storage unit 58, the frequency values of the contexts corresponding to the respective phonemes converted from the presented text. In the example, the frequency acquisition unit 59 acquires the frequency values corresponding to the respective contexts of "sil-m", "m-o", "o-Q", "Q-cw", "cw-a", "a-r", "r-e", "e-r", and "r-a" as illustrated in FIG. 9. For example, the frequency acquisition unit 59 acquires "1000000" as the frequency value of the context of "sil-m" corresponding to the first phoneme of "m". For another example, the frequency acquisition unit 59 acquires "1000" as the frequency value of the context of "Q-cw" corresponding to the fourth phoneme of "cw".

At Step S19, the weight calculator 60 calculates the weights corresponding to the respective phonemes converted from the presented text in accordance with the acquired frequency values of the contexts. As illustrated in FIG. 10, the weight calculator 60 calculates the weight corresponding to the phoneme for which the context has the frequency value smaller than a predetermined reference value, to be a first value (e.g., 0.1), while the weight calculator 60 calculates the weight corresponding to the phoneme for which the context has the frequency value equal to or larger than the predetermined reference value, to be a second value (e.g., 1.0), which is larger than the first value, in the example. For example, the weight calculator 60 calculates the weight corresponding to the first phoneme of "m" to be the second value (1.0). For another example, the weight calculator 60 calculates the weight corresponding to the fourth phoneme of "cw" to be the first value (0.1).

The weight calculator 60 sets the ratio of the first value to the second value as 10 times in the example. The ratio may be larger or smaller than 10 times. The specific processing at Step S19 will be described later with reference to FIG. 12.

At Step S20, the score calculator 61 calculates the score on the basis of the determination results of the time lengths of the output intervals of the respective phonemes and the weights calculated corresponding to the respective phonemes. In the example, the score calculator 61 calculates the score represented by any numeral value from 0 to 100. The specific processing at Step S20 will be described later with reference to FIG. 13.

At Step S21, the notifier 62 causes the display 41 of the terminal device 30 to display the score to notify the operator of the score. As illustrated in FIG. 11, the notifier 62 causes the display 41 to display a score window 72 displaying the score on a part of the presenting screen 70, in the example. The point adder 63 accesses the point management server, for example, and adds the point to the operator.

When the score is equal to or larger than a preset threshold, the notifier 62 adds a bonus point to the operator in addition to a regular point. In this case, as illustrated in FIG. 11, the notifier 62 causes the display 41 to display the value of the bonus point on the score window 72 to notify the operator that the bonus point is added.

At Step S22, the updating unit 64 updates the frequency values stored in the frequency storage unit 58 on the condition that the score is equal to or larger than a certain threshold. The recorder 65 stores the acquired voice and the output intervals of the respective phonemes in an internal or an external storage device. In this case, the recorder 65 stores the score in association with the voice.

Upon completion of the processing at Step S22, the voice processor 20 ends the processing of the flow.

Figure 12:
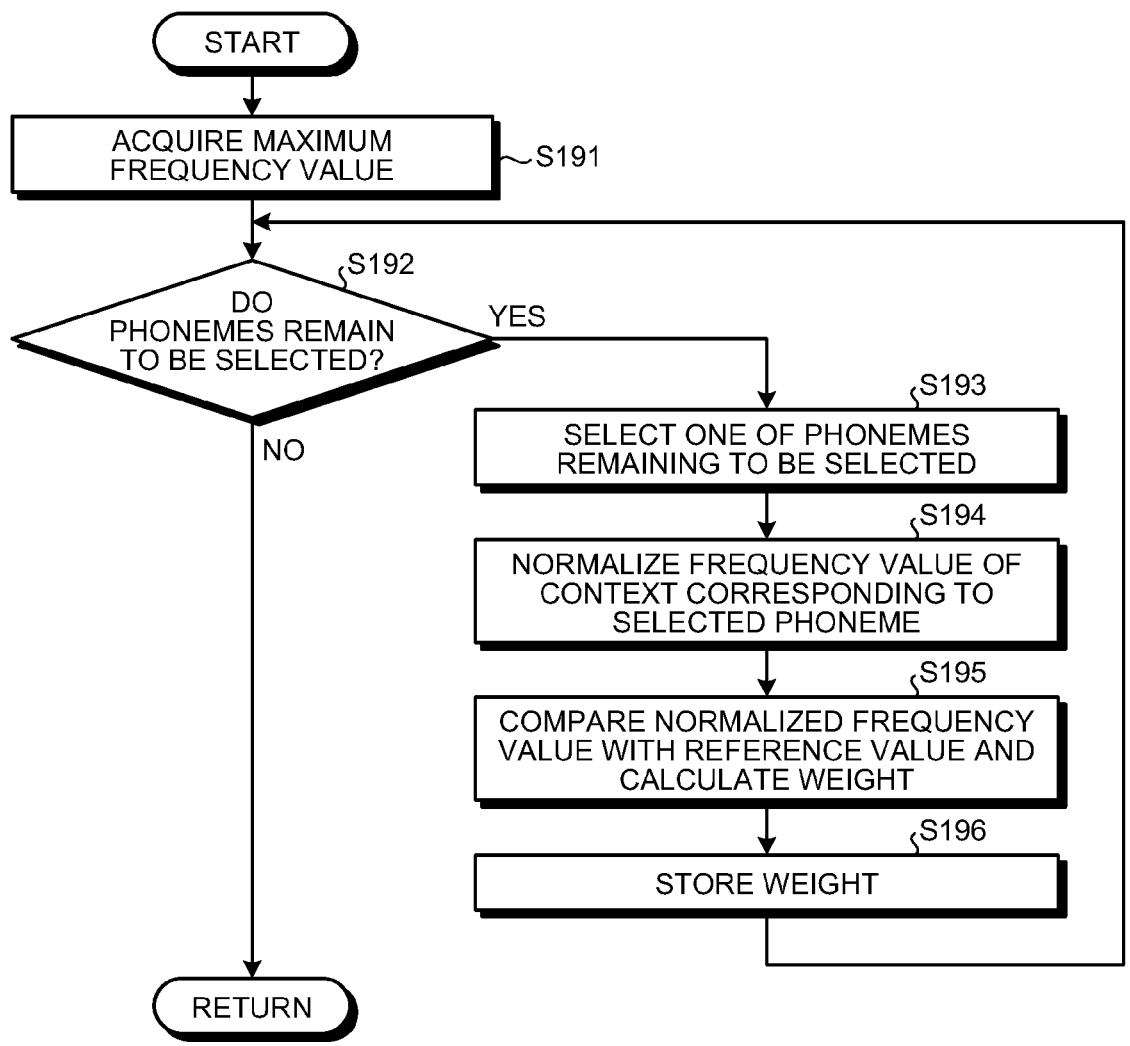
FIG. 12 is an exemplary flowchart of processing to calculate the weights of the respective phonemes.

FIG. 12 is a processing flow to calculate the weights of the phonemes. The weight calculator 60 performs the processing illustrated in FIG. 12 at Step S19 of FIG. 3.

At Step S191, the weight calculator 60 acquires a maximum in the frequency values of the contexts acquired by the frequency acquisition unit 59 from the frequency storage unit 58. As illustrated in FIG. 9, the weight calculator 60 acquires "2000000", which is the frequency value of the context of "r-e" corresponding to the seventh phoneme of "e", as the maximum, in the example.

At Step S192, the weight calculator 60 determines whether any phonemes remain to be selected in the phonemes converted from the presented text. If no phonemes remain to be selected (No at Step S192), the weight calculator 60 ends this flow and the processing returns to the main flow. If any phonemes remain to be selected (Yes at Step S192), the weight calculator 60 proceeds to Step S193.

At Step S193, the weight calculator 60 selects, as the processing target, any one phoneme from the phonemes remaining to be selected.

At Step S194, the weight calculator 60 normalizes the frequency value of the context corresponding to the selected phoneme. Specifically, the weight calculator 60 divides the frequency value of the context corresponding to the selected phoneme by the maximum acquired at Step S191 in the normalization processing. In the example illustrated in FIG. 9, when the first phoneme of "m" is selected, the normalized frequency value is calculated as follows: 1000000/2000000=0.5. In the example illustrated in FIG. 9, when the fourth phoneme of "cw" is selected, the normalized frequency value is calculated as follows: 1000/2000000=0.0005.

At Step S195, the weight calculator 60 compares the normalized frequency value with a preset reference value and calculates the weight corresponding to the selected phoneme. Specifically, the weight calculator 60 calculates the weight corresponding to the selected phoneme to be the first value (0.1) when the normalized frequency value is smaller than the reference value. The weight calculator 60 calculates the weight corresponding to the selected phoneme to be the second value (1.0) which is larger than the first value when the normalized frequency value is equal to or larger than the reference value.

In the example, the reference value is set to "0.1". As illustrated in FIG. 10, when the first phoneme of "m" is selected, the weight calculator 60 calculates the weight to be the second value (1.0) because the normalized frequency value is "0.5", which is larger than the reference value. When the fourth phoneme of "cw" is selected, the weight calculator 60 calculates the weight to be the first value (0.1) because the normalized frequency value is "0.0005", which is smaller than the reference value.

The weight calculator 60 may calculate the weight using not only two values but also three or more values. The weight calculator 60 may calculate the logarithmic value of the normalized frequency value as the weight.

At Step S196, the weight calculator 60 stores the calculated weight in association with the selected phoneme. The weight calculator 60 then returns to Step S192, and continues the processing from Step S192 to Step S196 until no phonemes remain to be selected.

Figure 13:
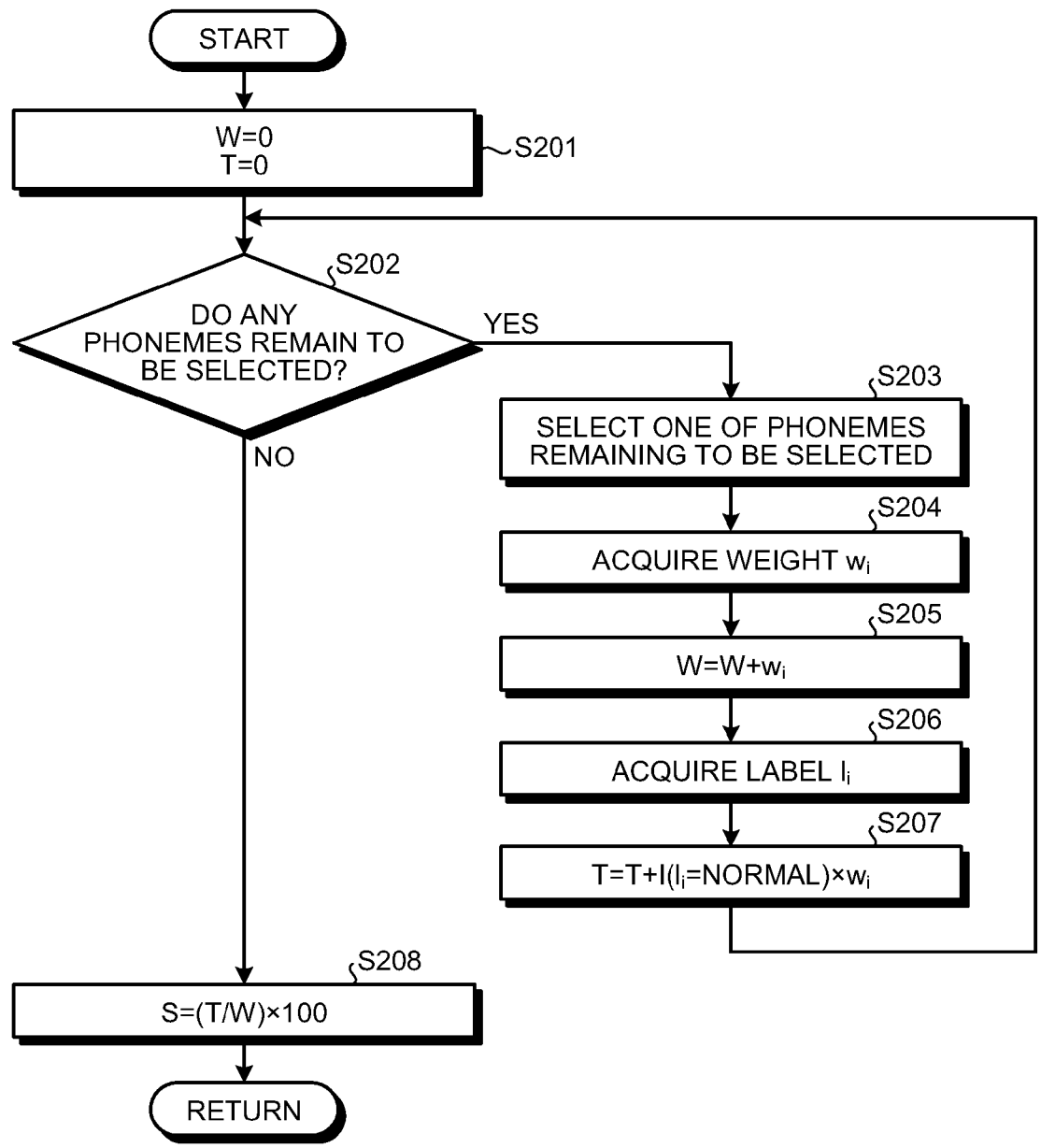
FIG. 13 is an exemplary flowchart of processing to calculate the score.

FIG. 13 illustrates a processing flow to calculate the score. The score calculator 61 performs the processing illustrated in FIG. 13 at Step S20 of FIG. 3.

At Step S201, the score calculator 61 substitutes "0" for variables W and T.

At Step S202, the score calculator 61 determines whether any phonemes remain to be selected in the phonemes converted from the presented text. If no phonemes remain to be selected (No at Step S202), the score calculator 61 proceeds to Step S208. If any phonemes remain to be selected (Yes at Step S202), the score calculator 61 proceeds to Step S203.

At Step S203, the score calculator 61 selects, as the processing target, any one phoneme from the phonemes remaining to be selected.

At Step S204, the score calculator 61 acquires a weight $w_i$ corresponding to the selected phoneme. For example, when the first phoneme of "m" is selected, the score calculator 61 acquires "weight $w_1=1.0$" as illustrated in FIG. 10. For another example, when the fourth phoneme of "cw" is selected, the score calculator 61 acquires "weight $w_4=0.1$" as illustrated in FIG. 10.

At Step S205, the score calculator 61 performs an arithmetic operation of $W=W+w_i$. In other words, the score calculator 61 adds the weight $w_i$ of the selected phoneme to the variable W.

At Step S206, the score calculator 61 acquires a label $l_i$ corresponding to the selected phoneme. For example, when the first phoneme of "m" is selected, the score calculator 61 acquires "label $l_1$=normal" as illustrated in FIG. 8. For another example, when the fourth phoneme of "cw" is selected, the score calculator 61 acquires "label $l_4$=abnormal" as illustrated in FIG. 8.

At Step S207, the score calculator 61 performs an arithmetic operation of "$T=T+I(l_i=\text{normal}) \times w_i$". $I(x)$ is a function. $I(x)=1$ when x is true while $I(x)=0$ when x is false. The score calculator 61 adds $w_i$ to T when the label $l_i$ is normal while the score calculator 61 adds no value to T when the label $l_i$ is abnormal.

Upon completion of the processing at Step S207, the score calculator 61 returns to Step S202, and repeats the processing from Step S202 to Step S207 until no phonemes remain to be selected. When no phonemes remain to be selected, the score calculator 61 proceeds to Step S208.

At Step S208, the score calculator 61 performs an arithmetic operation of "$S=(T/W) \times 100$" to calculate a score S. W represents the sum of the weights corresponding to the respective phonemes. T represents the sum of weights corresponding to the phonemes determined as normal.

The score calculator 61 thus calculates the score S by multiplying the ratio of the sum of the weights corresponding to the phonemes determined as normal to the sum of the weights corresponding to the respective phonemes by 100 in the arithmetic operation of "$S=(T/W) \times 100$".

The processing from Step S201 to Step S208 is expressed by the following expression (1).

$$S = \left[ \sum_{i=1}^{N} \{I(l_i = \text{Normal}) \times w_i\} \Big/ \sum_{i=1}^{N} w_i \right] \times 100 \quad (1)$$

In the example illustrated in FIGS. 8 and 10, the score calculator 61 calculates the score S as follows: S={(1×1.0)+(1×1.0)+(0×1.0)+(0×0.1)+(0×0.1)+(1×1.0)+(1×1.0)+(1×1.0)+(1×1.0)}/{1.0+1.0+1.0+0.1+0.1+1.0+1.0+1.0+1.0}×100=83.3.

As described above, the voice processor 20 reflects, in the score, the determination results of the phonemes included in the contexts having high occurrence frequencies by weighting the determination results in accordance with the occurrence frequencies of the phonemes included in the voices collected in the past.

In the forced alignment technique, the phoneme that was collected less in the past is more likely to include mistakes in the determination result than the phoneme that was collected more in the past. The voice processor 20 thus weights the phonemes that are more likely to include mistakes in the determination results by the forced alignment technique with small weights to reduce the influences whereas the voice processor 20 weights the phonemes that are less likely to include mistakes in the determination results by the forced alignment technique with large weights to increase the influences. As a result, the voice processor 20 can calculate the scores with high accuracy.

Figure 14:
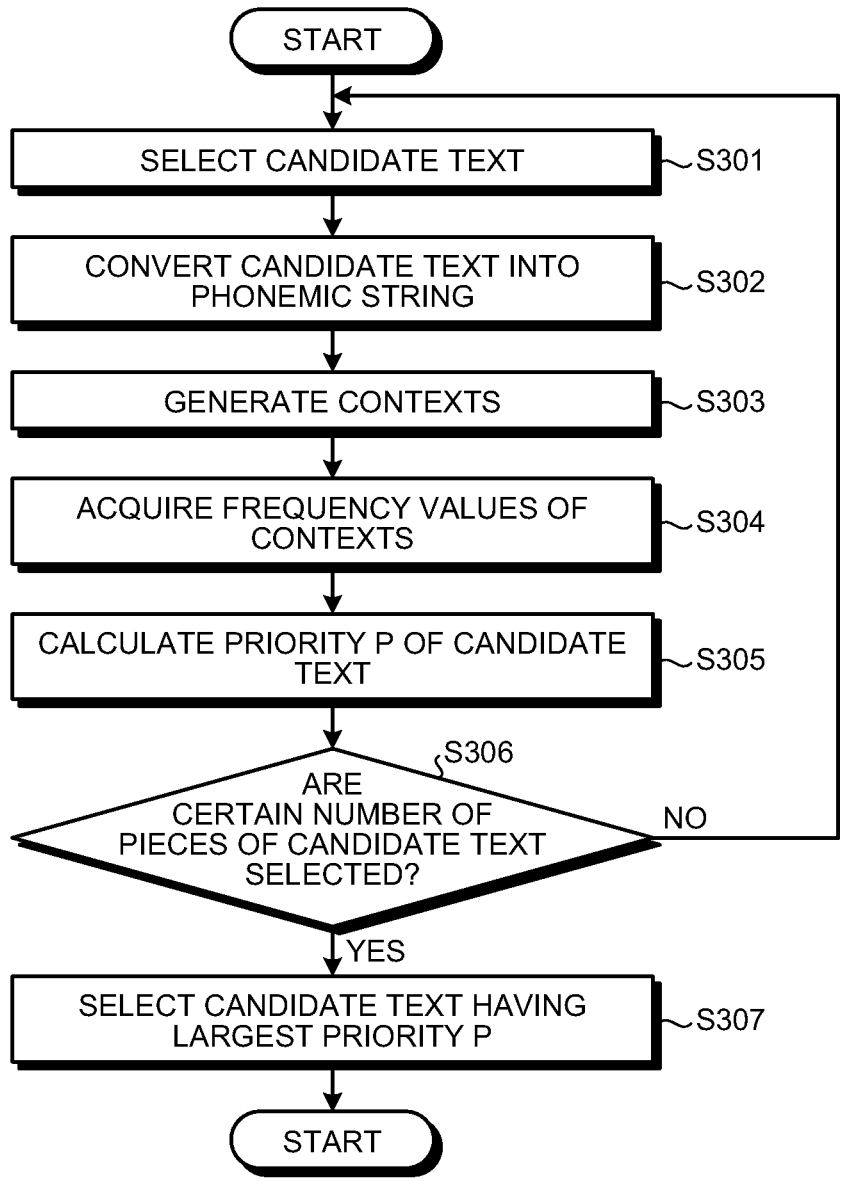
FIG. 14 is an exemplary flowchart of processing to select text.

FIG. 14 illustrates an example of the processing flow to select the text. The text selector 51 performs the processing flow illustrated in FIG. 14 to select the text to be presented to the operator, for example. The text selector 51 may perform the processing illustrated in FIG. 14 for each access from the terminal device 30 or in advance of the access from the terminal device 30.

At Step S301, the text selector 51 selects one piece of candidate text from a plurality of pieces of preliminarily prepared candidate text.

At Step S302, the text selector 51 converts the selected candidate text into a phonemic string. The processing at Step S302 is the same as that at Step S12 of FIG. 3.

At Step S303, the text selector 51 generates the contexts corresponding to the respective phonemes included in the phonemic string obtained by the conversion. The processing at Step S303 is the same as that at Step S13 of FIG. 3.

At Step S304, the text selector 51 acquires, from the frequency storage unit 58, the frequency values of the contexts corresponding to the respective phonemes converted from the candidate text. The processing at Step S304 is the same as that at Step S18 of FIG. 3.

At Step S305, the text selector 51 calculates a priority P of the candidate text on the basis of the frequency values corresponding to the respective phonemes. Specifically, the text selector 51 calculates the priority P by performing an arithmetic operation using the following expression (2).

$$P = \left[ \sum_{i=1}^{N_h} I(f_{(ci)} > f_{th}) + \sum_{i=N-N_h+1}^{N} I(f_{(ci)} > f_{th}) + \sum_{i=N_h+1}^{N-N_h} I(f_{(ci)} < f_{th}) \right] / N \quad (2)$$

Figures 15, 16:
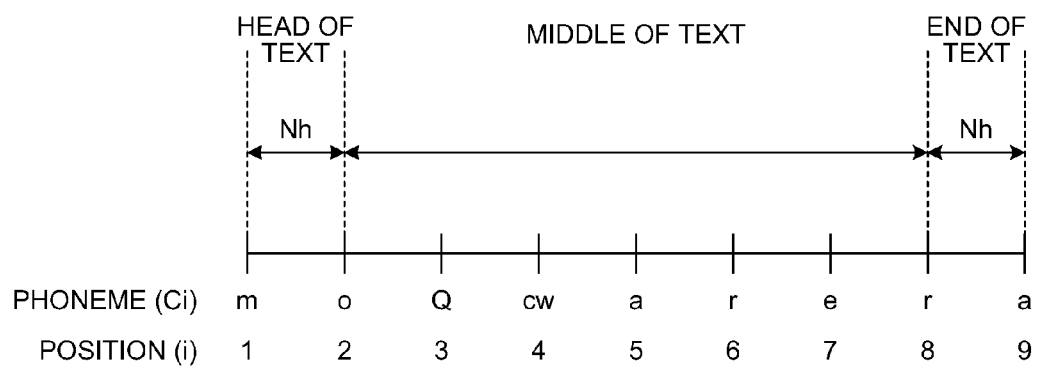
FIG. 15 is an exemplary diagram illustrating appearance positions of the contexts.
FIG. 16 is an exemplary diagram illustrating a phonemic string and contexts when English text is selected.

In expression (2), N is an integer equal to or larger than one and represents the number of phonemes of the candidate text. As illustrated in FIG. 15, i is an integer equal to or larger than one and represents the position of the phoneme from the head. $C_i$ represents the i-th phoneme. $f(C_i)$ represents the frequency value of the context corresponding to the i-th phoneme. $f_{th}$ is a constant and represents a threshold.

In expression (2), $N_h$ is a constant and represents an integer smaller than half the number of phonemes of the candidate text. More specifically, as illustrated in FIG. 15, $N_h$ is the constant designating the phonemes at the head of the text and the phonemes at the end of the text.

In expression (2), the first term of the numerator represents the number of phonemes with the contexts having the frequency values larger than the threshold, in $N_h$ phonemes at the head of the text. In expression (2), the second term of the numerator represents the number of phonemes with the contexts having the frequency values larger than the threshold, in $N_h$ phonemes at the end of the text.

In expression (2), the third term of the numerator represents the number of phonemes for which the contexts have the frequency values smaller than the threshold, in the phonemes excluding the $N_h$ phonemes at the head of the text and the $N_h$ phonemes at the end of the text (i.e., the phonemes in the middle of the text).

The text selector 51 calculates the priority P by adding the first term, the second term, and the third term of the numerator and dividing the numerator by the number N of phonemes of the candidate text as the result of the arithmetic operation of expression (2).

At Step S306, the text selector 51 determines whether a predetermined number of pieces of candidate text are selected. If the predetermined number of pieces of candidate text are not selected (No at Step S306), the text selector 51 returns to Step S301 and repeats the processing on another candidate text from Step S301. If the predetermined number of pieces of candidate text are selected (Yes at Step S306), the text selector 51 proceeds to Step S307.

At Step S307, the text selector 51 selects the candidate text having the largest priority P in the pieces of candidate text as the text to be presented to the operator. Upon completion of the processing at Step S307, the text selector 51 ends the flow.

Through the processing described above, the text selector 51 can select the following candidate text in preference to the other candidate text. The preferred candidate text includes the phonemes for which the contexts have the frequency values larger than the threshold, at the head and the end of the text, and the phonemes for which the contexts have the frequency values smaller than the threshold, in a part of the text other than the head and the end thereof (i.e., in the middle of the text).

In this way, the voice processor 20 preferentially selects the text including the phonemes for which the contexts have large frequency values at the head of the text. The voice processor 20 thus can increase the weights corresponding to the phonemes at the head of the text. As a result, when the phonemes at the head of the text are determined as abnormal because it is cut out due to wrong operation of the recording button 71, for example, the voice processing system 10 can reduce the score without fail.

The voice processor 20 preferentially selects the text including the phonemes for which the contexts have large frequency values at the end of the text. As a result, the voice processor 20 can increase the weights corresponding to the phonemes at the end of the text. When the operator stops reading aloud the text halfway and thus the phonemes at the end of the text are determined as abnormal, for example, the voice processor 20 can reduce the score without fail.

The voice processor 20 preferentially selects the text including the phonemes for which the contexts have small frequency values, in a part of the text other than the head and the end thereof (i.e., in the middle of the text). It is preferable for the voice processing system 10 to collect different phonemes as many as possible to the certain minimum number of the respective phonemes. The voice processor 20 preferentially selects the text including the phonemes for which the contexts have small frequency values, thus can reliably acquire the voices including the phonemes collected less in the past.

As described above, the voice processing system 10 according to the embodiment weights the determination results of the phonemes included in the acquired voice in accordance with the occurrence frequencies of the contexts included in the voices collected in the past. The voice processing system 10 thus can increase the weights of the determination results of the phonemes that are more likely to be correct and reduce the weights of the determination results of the phonemes that are less likely to be correct. As a result, the voice processing system 10 can calculate the scores with high accuracy.

The voice processing system 10 encourages the operator to read aloud the text correctly by notifying the operator of the accurate score, thereby making it possible to acquire high quality voices. The voice processing system 10 can calculate the accurate score, thereby enabling the voice processing using the acquired voices to be performed with high accuracy.

The voice processing system 10 preferentially selects the text from which the accurate score is calculated and presents the text to the operator, thereby enabling the accurate score to be reliably calculated.

FIGS. 16 to 20 illustrate an example of a case where text in English is read aloud. In the embodiment described above, a case is described where text in Japanese is read aloud. The voice processing system 10 can also be applied to a case where text in a language other than Japanese is read aloud.

As an example, the text selector 51 selects an English sentence of "avocado cake". In this case, as illustrated in FIG. 16, the phonemic string converter 52 converts the text of "avocado cake" into the phonemic string of "ae-v-@-k-aa-d-ou-k-ei-k", which is composed of 10 phonemes.

As illustrated in FIG. 16, the context generator 53 generates the contexts of "sil-ae", "ae-v", "v-@", "@-k", "k-aa", "aa-d", "d-ou", "ou-k", "k-ei", and "ei-k" corresponding to the respective phonemes.

As illustrated in FIG. 17, the identifying unit 56 identifies the output intervals of the respective phonemes. For example, the identifying unit 56 identifies on the first phoneme of "ae" that the start time is 1.20 seconds and the end time is 1.29 seconds. For another example, the identifying unit 56 identifies on the sixth phoneme of "d" that the start time is 1.62 seconds and the end time is 1.65 seconds.

As illustrated in FIG. 18, the determination unit 57 determines whether the time length of the identified output interval of each of the respective phonemes is normal. For example, the determination unit 57 determines that the phoneme having the time length smaller than 0.05 seconds or larger than 0.15 seconds is abnormal. For example, the determination unit 57 determines that the first phoneme of "ae" is normal because the time length is 0.09 seconds. For another example, the determination unit 57 determines that the sixth phoneme of "d" is abnormal because the time length is 0.03 seconds.

As illustrated in FIG. 19, the frequency acquisition unit 59 acquires, from the frequency storage unit 58, the frequency values of the contexts corresponding to the respective phonemes. For example, the frequency acquisition unit 59 acquires "1000000" as the frequency value of the context of "sil-ae" corresponding to the first phoneme of "ae". For another example, the frequency acquisition unit 59 acquires "2000" as the frequency value of the context of "aa-d" corresponding to the sixth phoneme of "d".

As illustrated in FIG. 20, the weight calculator 60 calculates the weights corresponding to the respective phonemes in accordance with the acquired frequency values of the contexts. For example, the weight calculator 60 calculates the weight corresponding to the first phoneme of "ae" to be the second value (1.0). For another example, the weight calculator 60 calculates the weight corresponding to the sixth phoneme of "d" to be the first value (0.1).

The score calculator 61 calculates the score on the basis of the determination results of the time lengths of the output intervals of the respective phonemes illustrated in FIG. 18 and the weights calculated corresponding to the respective phonemes illustrated in FIG. 20. Specifically, in the example illustrated in FIGS. 18 and 20, the score calculator 61 calculates the score S as follows: $S=\{(1\times1.0)+(1\times1.0)+(1\times1.0)+(1\times1.0)+(1\times1.0)+(0\times0.1)+(0\times0.1)+(1\times1.0)+(1\times1.0)+(1\times1.0)\}/\{1.0+1.0+1.0+1.0+1.0+0.1+0.1+1.0+1.0+1.0\}\times100=97.5$.

Figure 21:
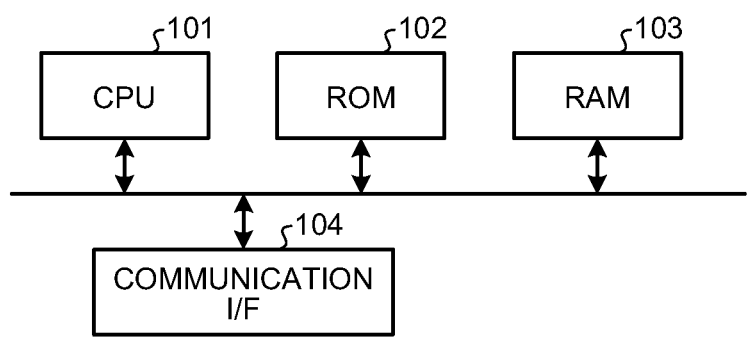
FIG. 21 is an exemplary hardware structural diagram of the voice processor.

FIG. 21 is a schematic diagram illustrating an example of a hardware structure of the voice processor 20 in the embodiment. The voice processor 20 in the embodiment comprises a controller such as a central processing unit (CPU) 101, storage devices such as a read only memory (ROM) 102 and a random access memory (RAM) 103, a communication interface (I/F) 104 that communicates by being connected to a network, and a bus connecting these components.

A voice processing program executed by the voice processor 20 in the embodiment is provided by being preliminarily stored in the ROM 102, for example.

The voice processing program executed by the voice processor 20 in the embodiment may be recorded in a storage medium readable by a computer as a file in an installable or executable format, and provided as a computer program product. The examples of the storage medium include a compact disk ROM (CD-ROM), a flexible disk (FD), a CD-recordable (CD-R), and a digital versatile disk (DVD).

The voice processing program executed by the voice processor 20 in the embodiment may be stored in a computer coupled with the network such as the Internet, and be provided by being downloaded through the network. The voice processing program executed by the voice processor 20 in the embodiment may be provided or distributed through the network such as the Internet.

The voice processing program executed by the voice processor 20 in the embodiment can cause the computer to function as the respective units of the voice processor 20 (the text selector 51, the phonemic string converter 52, the context generator 53, the presenting unit 54, the voice acquisition unit 55, the identifying unit 56, the determination unit 57, the frequency storage unit 58, the frequency acquisition unit 59, the weight calculator 60, the score calculator 61, the notifier 62, the point adder 63, the updating unit 64, and the recorder 65). A part or all of the units may be achieved by hardware implementation. The CPU 101 of the computer can read out the program from the computer readable storage medium to the main storage device and execute the program.

While certain embodiments have been described, the embodiment has been presented by way of example only, and is not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. A voice processing device, comprising:
a processor that operates as:

a presenting unit that presents text to an operator;
a voice acquisition unit that acquires a voice of the operator reading aloud the text;
an identifying unit that identifies output intervals of phonemes included in the voice of the operator;
a determination unit that determines whether each of time lengths of the output intervals is normal;
a frequency acquisition unit that acquires frequency values respectively representing occurrence frequencies of contexts, respectively corresponding to the phonemes, each context including the phoneme and another phoneme adjacent to at least one side of the phoneme;
a weight calculator that calculates a weight corresponding to each of the phonemes in accordance with a frequency value of the context; and
a score calculator that calculates, as a score representing correctness of the voice of the operator, a value in accordance with a ratio of a first value to a second value, the first value representing a sum of weights corresponding to the phonemes, the second value representing a sum of weights corresponding to the phonemes having the time lengths of the output intervals that are determined as normal.

2. The voice processing device according to claim 1, wherein the weight calculator calculates the weight such that a weight corresponding to a first phoneme is larger than a weight corresponding to a second phoneme, the first phoneme having a value that is equal to or larger than a value for which a corresponding frequency value is preset, the second phoneme having a value that is smaller than the value for which the corresponding frequency value is preset.

3. The voice processing device according to claim 1, wherein the processor further operates as:
a notifier that notifies the operator of content according to the score.

4. The voice processing device according to claim 1, wherein the processor further operates as:
a frequency storage unit that stores therein occurrence frequencies of a plurality of contexts included in voices acquired in the past, as the frequency values;
an updating unit that updates the frequency values, which are stored in the frequency storage unit, of the contexts corresponding to the phonemes included in the voice of the operator reading aloud the text in accordance with the score; and
a text selector that selects, as the text, one piece of text from among a plurality of pieces of candidate text, wherein
the text selector selects the text on the basis of the frequency values of contexts corresponding to a plurality of phonemes included in the pieces of candidate text when the pieces of candidate text are read aloud.

5. The voice processing device according to claim 4, wherein the text selector selects the candidate text in preference to the other candidate text, the preferred candidate text including the phonemes for which the contexts have the frequency values larger than a threshold at the head of and the end of the text and the phonemes for which the contexts have the frequency values smaller than the threshold at a part of the text other than the head and the end of the text.

6. A voice processing method, comprising: presenting, by a processor, text to an operator; acquiring, by the processor, a voice of the operator reading aloud the text;
identifying, by the processor, output intervals of phonemes included in the voice of the operator;
determining, by the processor, whether each of time lengths of the output intervals is normal;

acquiring, by the processor, frequency values respectively representing occurrence frequencies of contexts, respectively corresponding to the phonemes, each context including the corresponding phoneme and another phoneme adjacent to at least one side of the phoneme;
calculating, by the processor, a weight corresponding to each of the phonemes in accordance with a frequency value of the context; and
calculating, by the processor, as a score representing correctness of the voice of the operator, a value in accordance with a ratio of a first value to a second value, the first value representing a sum of weights corresponding to the phonemes, the second value representing a sum of weights corresponding to the phonemes having the time lengths of the output intervals that are determined as normal.

7. A computer program product comprising a non-transitory computer-readable medium containing a voice processing program that causes a computer to function as:
a presenting unit that presents text to an operator;
a voice acquisition unit that acquires a voice of the operator reading aloud the text;
an identifying unit that identifies output intervals of phonemes included in the voice of the operator;
a determination unit that determines whether each of time lengths of the output intervals is normal;
a frequency acquisition unit that acquires frequency values respectively representing occurrence frequencies of contexts, respectively corresponding to the phonemes, each context including the phoneme and another phoneme adjacent to at least one side of the phoneme;
a weight calculator that calculates a weight corresponding to each of the phonemes in accordance with a frequency value of the context; and
a score calculator that calculates, as a score representing correctness of the voice of the operator, a value in accordance with a ratio of a first value to a second value, the first value representing a sum of weights corresponding to the phonemes, the second value representing a sum of weights corresponding to the phonemes having the time lengths of the output intervals that are determined as normal.

8. A voice processing device, comprising:
a processor that operates as:
a presenting unit that presents text to an operator;
a voice acquisition unit that acquires a voice of the operator reading aloud the text;
an identifying unit that identifies output intervals of phonemes included in the voice of the operator;
a determination unit that determines whether each of time lengths of the output intervals is normal;
a frequency acquisition unit that acquires frequency Values respectively representing occurrence frequencies of contexts, respectively corresponding to the phonemes, each context including the phoneme and another phoneme adjacent to at least one side of the phoneme;
a score calculator that calculates a score representing correctness of the voice of the operator on the basis of the frequency values of the contexts acquired respectively corresponding to the phonemes having the time lengths of the output intervals that are determined as normal;
a frequency storage unit that stores therein occurrence frequencies of a plurality of contexts included in voices acquired in the past, as the frequency values;

an updating unit that updates the frequency values, which are stored in the frequency storage unit, of the contexts corresponding to the phonemes included in the voice of the operator reading aloud the text in accordance with the score; and
a text selector that selects, as the text, one piece of text from among a plurality of pieces of candidate text, wherein
the text selector selects the text on the basis of the frequency values of contexts corresponding to a plurality of phonemes included in the pieces of candidate text when the pieces of candidate text are read aloud.

\* \* \* \* \*